US008937688B1

(12) United States Patent
Tuccillo

(10) Patent No.: US 8,937,688 B1
(45) Date of Patent: Jan. 20, 2015

(54) TELEVISION COVER CONFIGURATION

(76) Inventor: Ronald Tuccillo, Lake Havasu, AZ (US)

( * ) Notice: Subject to any disclaimer, the term of this patent is extended or adjusted under 35 U.S.C. 154(b) by 783 days.

(21) Appl. No.: 13/200,730

(22) Filed: Sep. 29, 2011

Related U.S. Application Data

(60) Provisional application No. 61/404,177, filed on Sep. 29, 2010.

(51) Int. Cl.
*H04N 5/64* (2006.01)
(52) U.S. Cl.
CPC ............................... *H04N 5/64* (2013.01)
USPC .......................................................... 348/836
(58) Field of Classification Search
CPC ........................................................ H04N 5/64
USPC .......................................................... 348/836
See application file for complete search history.

(56) References Cited

U.S. PATENT DOCUMENTS

| | | | |
|---|---|---|---|
| 3,418,426 A | 12/1968 | Schlegel et al. | |
| 5,175,627 A | 12/1992 | Josephs | |
| 6,271,894 B1* | 8/2001 | Storz | 348/836 |
| 6,846,083 B1 | 1/2005 | Mylar | |
| 7,312,836 B2 | 12/2007 | Maxson | |
| 2008/0230192 A1 | 9/2008 | Kane | |

* cited by examiner

*Primary Examiner* — Allen Wong
(74) *Attorney, Agent, or Firm* — Harpman & Harpman

(57) ABSTRACT

A cover for a television that provides for an interchangeable screen insert sleeve into which decorative art work can be selectively displayed when the television is not in use. An adjustable elastic retention band within the cover allows for selective attached engagement and retention on the television with adaptable storage pockets for television remotes and the like positioned thereon.

7 Claims, 3 Drawing Sheets

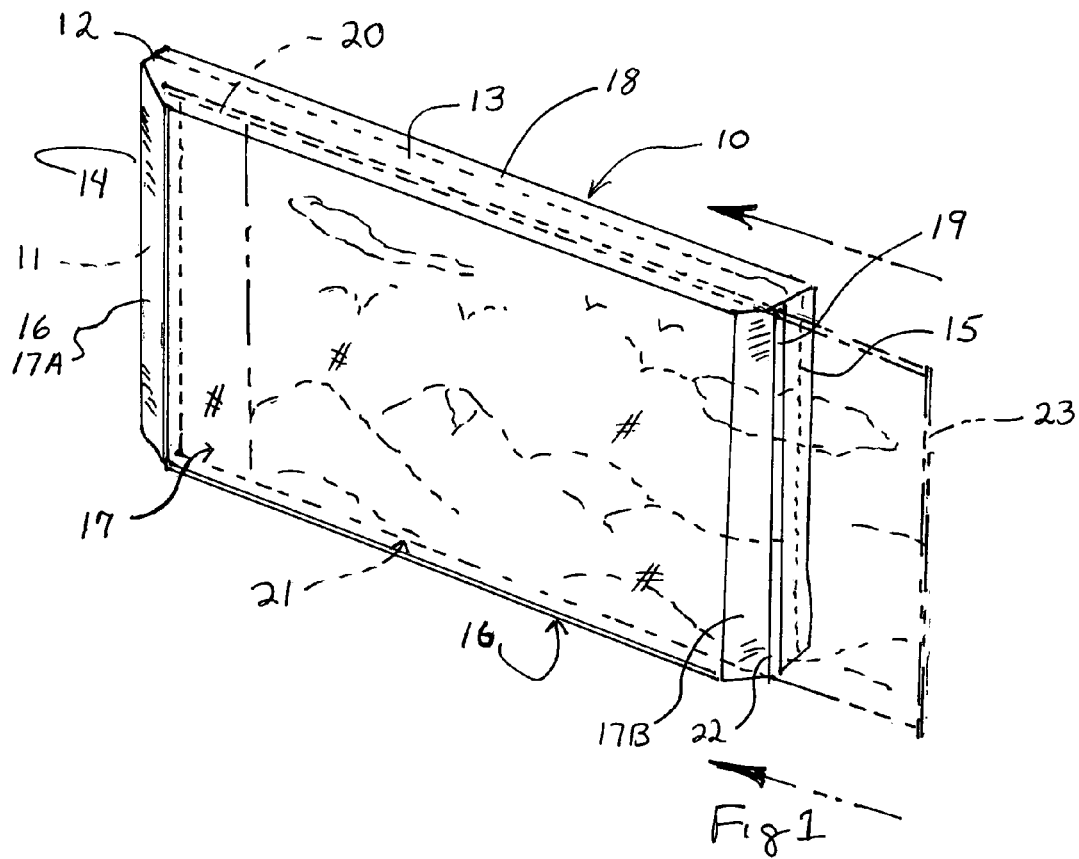
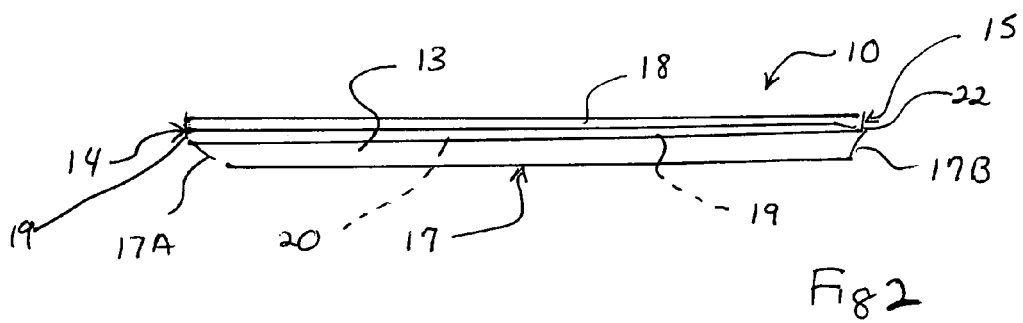

TELEVISION COVER CONFIGURATION

This application claims the benefit of U.S. Provisional Application No. 61/404,177, filed on Sep. 29, 2010.

BACKGROUND OF THE INVENTION

1. Technical Field

This invention relates to devices used to cover the screen of a television while not in use with a decorative display.

2. Description of Prior Art

Prior art devices of this type have been directed to covers for flat panel displays that are hung on walls and present a large static blank surface area when not in use. As such, a number of covers have been developed to hide and cover the flat panel screens when not in use, see U.S. Pat. Nos. 3,418,426, 5,175,627, 6,846,083, 7,312,836 and U.S. Publication 2008/0230192.

U.S. Pat. No. 3,418,426 illustrates a removable protective cover for a TV in which a housing attached to the front surface is provided and a protective panel is inserted therewithin.

U.S. Pat. No. 5,175,627 claims an adjustable television mask to impart borders to the screen to accommodate letter box and wide screen aspect ratios of broadcast material. The mask attaches to the perimeter front edges of the screen leaving the desired unmasked center portion viewable.

U.S. Pat. No. 6,846,083 discloses a TV screen cover in which a cover for reducing glare and light is releasably secured thereon with a winding spool allowing the cover to be retracted like a window blind when not in use. U.S. Pat. No. 7,312,866 describes a television display cover for an LCD flat panel screen in which the cover is attached to a pair of support brackets that allow it to hinge upwardly from the screen for TV use.

Finally, in U.S. Patent Publication 2008/0230192 a television tapestry cover is disclosed in which a tapestry extends from a reel positioned above the television. This allows the decorative tapestry to be rolled up by the spring urged reel when not in use.

SUMMARY OF THE INVENTION

A self-contained integrated television cover for adjustably positioning over the screen thereof. The cover extends around the edge of the screen and television resiliently retained thereon by an inclusive perimeter elastic strap. A large sleeve is created within the front wall into which screen size decorative panels can be inserted concealing this screen when not in use. Optional equipment receiving pockets may be provided to allow the television accessories such as TV remotes to be stored for easy access and use on the sides of the cover.

DESCRIPTION OF THE DRAWINGS

FIG. 1 is a perspective view of the television cover positioned on a flat panel television.

FIG. 2 is a top plan view thereof.

DETAILED DESCRIPTION OF THE INVENTION

Figure 3:
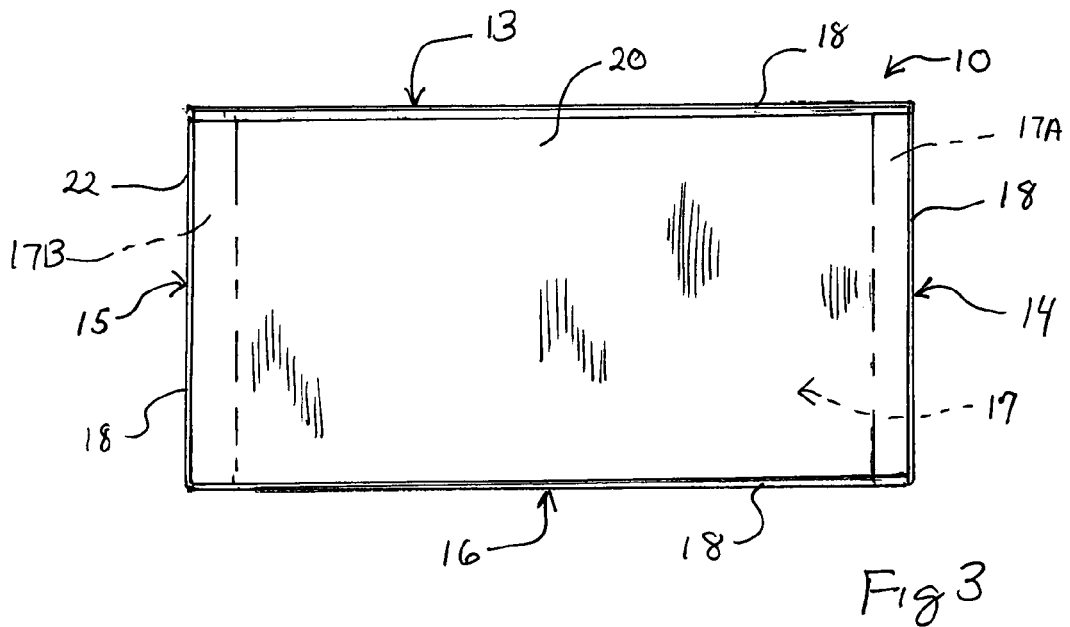
FIG. 3 is a rear elevational view thereof.

Referring to FIGS. 1-4 of the drawings, a decorative cover 10 for a flat panel television 11 can be seen to provide a cover therefore. A decorative cover 10 of the invention, best seen in FIG. 1 of the drawings is positioned over the flat panel 11, such as an LCD or plasma television display common in the industry. Such flat panel displays 11 typically of a large dimension and often mounted to the walls, not shown, in most applications.

The decorative cover 10 of the invention has a main rectangular body member 12 with an integral top wall 13, oppositely disposed depending sidewalls 14 and 15 and interconnected bottom 16 in spaced parallel relation to the top wall 13. A front transparent wall 17 interengaged to the respective top, side and bottom walls 13, 14, 15 and 16 define an open back housing for positioning over the front and onto the flat panel television 11.

A continuous elastic retaining band 18 is secured to and about the respective top, side and bottom walls, 13, 14, 15 and 16 surface preferably along their respective perimeter edges.

A decorative panel insert receiving sleeve 19 is formed between the transparent front wall 17 and the open back of the housing by an intermediate partition 20 preferably of a visually opaque material which directly overlies the television screen surface 21 when positioned thereon.

The transparent front wall 17 may have tapered portions 17A and 17B as illustrated to accommodate the sleeve 19 as well as variation in TV bezel designs as will be described in greater detail hereinafter.

The elastic retaining band 18 enables positioning, placement and secure selective retainment of the cover 10 onto the flat panel TV 11 adjusting to variables and television designs in sizes within known parameters.

It will be evident to those skilled in the art that multiple size covers 10 would be needed to accommodate the variety of known television screen sizes.

Figure 4:
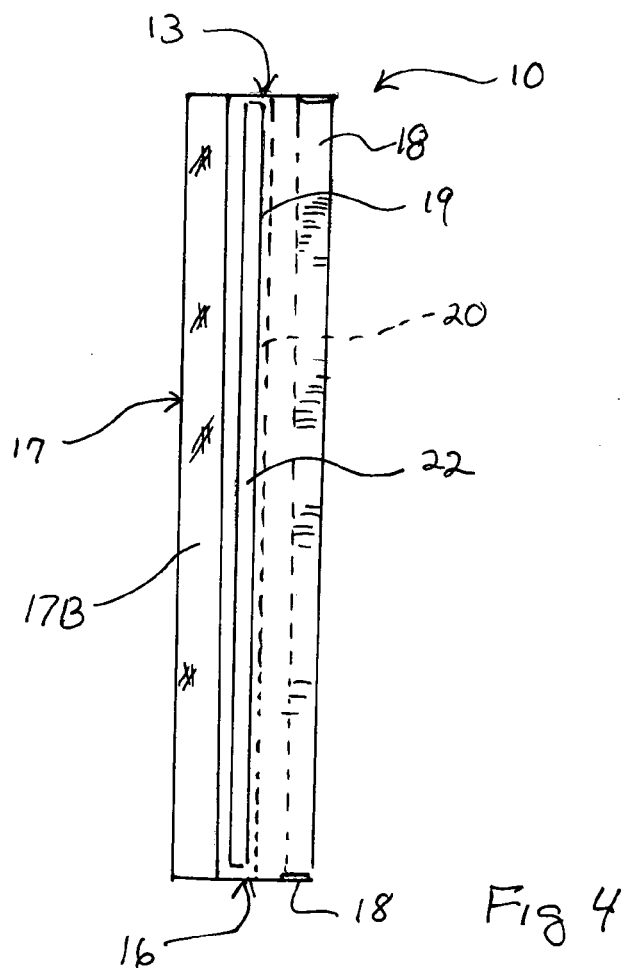
FIG. 4 is an enlarged end elevational view thereof showing access insertion of a decorative panel into the cover.

Referring now to FIG. 4 of the drawings, an access sleeve portal 22 can be seen formed within the sidewall 15 defined as an elongated rectangular opening therewithin in offset alignment to the hereinbefore described sleeve partition 20 forming the insert receiving sleeve 19.

In operation, a decorative insert panel 23, shown in broken lines in FIG. 1 of the drawings for illustration, can be selectively inserted within the insert receiving sleeve 19 and correspondingly covering the television screening area 21 of the flat panel TV 11 onto which the decorative cover 10 of the invention has been resiliently retained. The decorative display panel 23 which can be of any subject, color or pattern such as art work, commercial posters and the like will thus be visible through the transparent front wall 17 imparting a unique custom decorative display for the television when not in use.

It will be well understood that the cover 10 may be made of a variety of sheet good materials seamed together including synthetic resin material, cloth or even leather, all of which would be well within the parameters defined under the doctrine of equivalency.

Preferably the front wall 17 will be of synthetic resin material given the transparent nature required for functionality.

Figure 5:
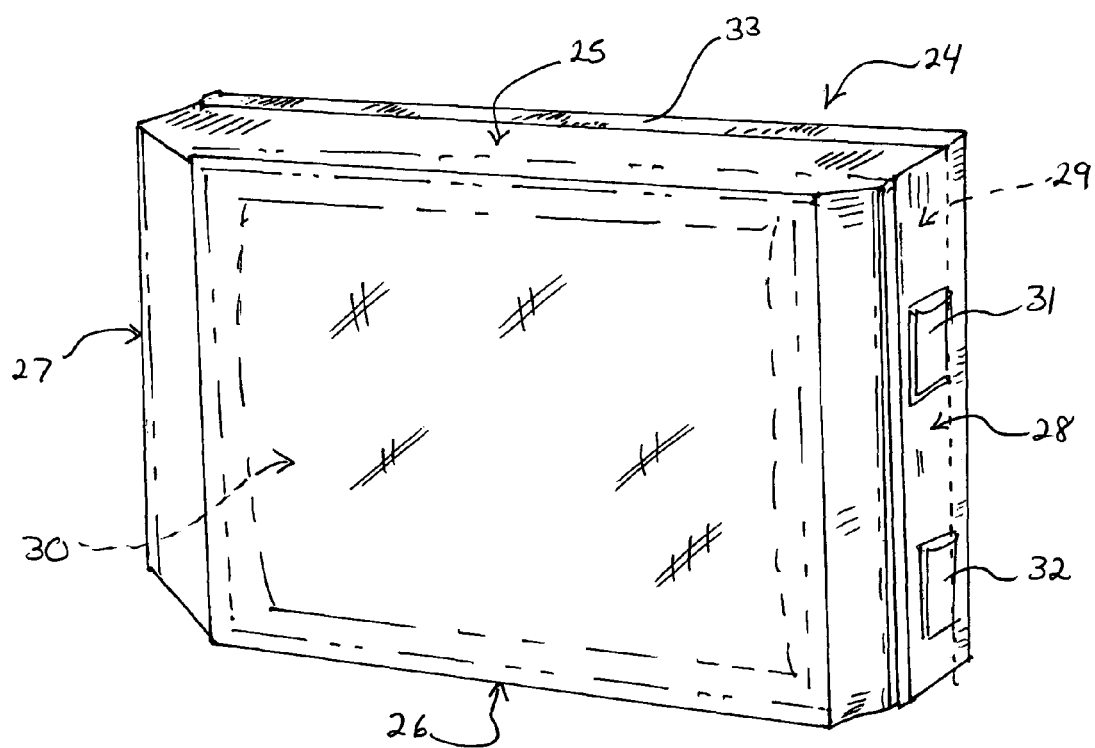
FIG. 5 is a perspective view of an alternate cover configuration for conventional tube-type televisions.

Referring now to FIG. 5 of the drawings, an alternate form of the invention can be seen wherein a modified television cover 24 has increased dimensional top, bottom and sidewalls 25, 26, 27, 28 and 29 respectively which will allow the use on traditional televisions 30 of a tube type. An elastic retainment band 33 extends about the respective pressure walls. As such, the increased wall dimension allows for inclusion of multiple equipment storage pockets 31 and 32 which can be used to store TV remotes (not shown) and the like.

It will be seen that such storage pockets may also be placed in the preferred embodiment cover 10 of the invention within the area of the cover beyond the transparent front wall 17 so as to provide ancillary storage as noted above, if so desired.

It will thus be seen that a new and novel decorative cover for a television has been illustrated and described and it will be apparent to those skilled in the art that various changes and modifications may be made thereto without departing from the spirit of the invention.

Therefore I claim:

1. An interchangeable decorative cover for a television screen comprising,
    a flexible housing having interconnected top, sides, bottom and front walls,
    an elastic retainment band extending over and integral with said top, sides and bottom walls,
    said front wall being transparent overlying the television screen when secured thereto,
    a decorative insert receiving sleeve defined by said front wall for receiving a decorative panel therewithin.

2. The interchangeable decorative cover set forth in claim 1 wherein said insert receiving sleeve has elongated access opening within one of said sidewalls for receiving said decorative panel therewithin.

3. The interchangeable decorative cover set forth in claim 1 wherein said elastic retainment band is positioned adjacent the respective perimeter edges of said top, side and bottom walls of said housing.

4. The interchangeable decorative cover set forth in claim 1 wherein said insert receiving sleeve has an intermediate partition secured in spaced relation to said front wall.

5. The interchangeable decorative cover set forth in claim 1 wherein said housing is preferably made of synthetic resin material.

6. An interchangeable decorative cover for a television screen comprising,
    a flexible housing having a front transparent wall and interconnected top, bottom and oppositely disposed sidewalls thereon,
    an elastic retainment band extending integrally about said top, bottom and sidewalls to selectively retain said cover over said television screen,
    an insert receiving sleeve defined by said front wall,
    retainment pockets positioned on said sidewalls.

7. The interchangeable decorative cover set forth in claim 6 wherein said insert receiving sleeve has an access opening in one of said sidewalls for receiving a decorative insert panel of a dimension equal to that of said television screen.

\* \* \* \* \*